US011916915B2

(12) United States Patent
Rao Krishnagi et al.

(10) Patent No.: US 11,916,915 B2
(45) Date of Patent: Feb. 27, 2024

(54) METHOD AND SYSTEM FOR MULTIPLATFORM FILE TRANSFER

(71) Applicant: JPMorgan Chase Bank, N.A., New York, NY (US)

(72) Inventors: Kumar Rao Krishnagi, Powell, OH (US); Matthew J Porter, Mechanicsburg, OH (US); Nalini S Boda, Lewis Center, OH (US); Mark Alan Wells, Dublin, OH (US); Neaz Ahmed Kishore, Delaware, OH (US); Josh Hall, Columbus, OH (US); Vijay Kumar Perla, Westerville, OH (US); Laxman Dongisharapu, Hyderabad (IN)

(73) Assignee: JPMORGAN CHASE BANK, N.A., New York, NY (US)

( * ) Notice: Subject to any disclaimer, the term of this patent is extended or adjusted under 35 U.S.C. 154(b) by 67 days.

(21) Appl. No.: 17/238,728

(22) Filed: Apr. 23, 2021

(65) Prior Publication Data

US 2022/0294795 A1    Sep. 15, 2022

(30) Foreign Application Priority Data

Mar. 9, 2021    (IN) .............................. 202111009824

(51) Int. Cl.
| G06F 21/33 | (2013.01) |
| G06F 21/41 | (2013.01) |
| G06F 7/04 | (2006.01) |
| H04L 9/32 | (2006.01) |
| H04L 9/40 | (2022.01) |
| H04L 67/06 | (2022.01) |
| H04L 67/1097 | (2022.01) |

(52) U.S. Cl.
CPC ........ *H04L 63/102* (2013.01); *H04L 63/0815* (2013.01); *H04L 67/06* (2013.01); *H04L 67/1097* (2013.01)

(58) Field of Classification Search
None
See application file for complete search history.

(56) References Cited

U.S. PATENT DOCUMENTS

| 6,085,251 | A * | 7/2000 | Fabozzi, II | H04L 69/16 709/219 |
| 9,106,642 | B1 * | 8/2015 | Bhimanaik | H04L 63/0807 |
| 2006/0218628 | A1 * | 9/2006 | Hinton | H04L 63/0815 726/8 |
| 2010/0333116 | A1 * | 12/2010 | Prahlad | G06F 3/067 713/153 |

(Continued)

*Primary Examiner* — Nicholas R Taylor
*Assistant Examiner* — Ho T Shiu
(74) *Attorney, Agent, or Firm* — Greenblum & Bernstein, P.L.C.

(57) ABSTRACT

A method for providing an application to facilitate authenticated file transfers across a plurality of computing platforms is disclosed. The method includes receiving, from a client application, a call to perform an action, the call including a message to transfer a file; validating, by using an identity federation service, the call based on the message; authorizing the call and the client application based on a result of the validating; accessing a networked repository via a secured communication protocol when the call and the client application is authorized; and initiating the action.

20 Claims, 12 Drawing Sheets

(56) References Cited

U.S. PATENT DOCUMENTS

| | | | |
|---|---|---|---|
| 2013/0219456 A1* | 8/2013 | Sharma | H04L 9/0894 726/1 |
| 2015/0264019 A1* | 9/2015 | Carroll | H04L 63/0428 726/26 |
| 2019/0306221 A1* | 10/2019 | Venkivolu | H04L 63/0428 |
| 2020/0322664 A1* | 10/2020 | Holtz | H04N 21/44222 |

* cited by examiner

600

700A

700B

800

900A

900B

METHOD AND SYSTEM FOR MULTIPLATFORM FILE TRANSFER

CROSS-REFERENCE TO RELATED APPLICATIONS

This application claims the benefit of Indian Provisional Patent Application No. 202111009824, filed Mar. 9, 2021, which is hereby incorporated by reference in its entirety.

BACKGROUND

1. Field of the Disclosure

This technology generally relates to methods and systems for transferring files, and more particularly to methods and systems for providing a reusable, plug and play microservice application to facilitate authenticated file transfers across a plurality of computing platforms and a plurality of storage options.

2. Background Information

Many business entities operate large enterprise networks that are comprised of numerous applications to provide services for customers as well as employees. Often, applications within the enterprise networks must communicate with and transfer files to other applications to perform a predetermined task. Historically, conventional techniques for facilitating application to application file transfers have resulted in varying degrees of success with respect to file transfer resiliency, multi-part file upload capability, and file transfer security.

One drawback of using conventional techniques for facilitating application to application file transfers is that in many instances, the files are transferred sequentially—one file at a time per route. As a result, the rate at which a large file may be transferred is greatly affected. Further, the sequentially transferred files often require a manual restart of the route in the event of a file transfer failure. The manual restarting of the file transfer greatly affects system efficiency and performance. Additionally, when a file location is changed, a file route must be manually updated to properly route the file to an appropriate pool.

Therefore, there is a need for a reusable, plug and play microservice application that is highly resilient and supports multithreaded transfers to facilitate authenticated file transfers across a plurality of computing platforms and storage options.

SUMMARY

The present disclosure, through one or more of its various aspects, embodiments, and/or specific features or sub-components, provides, inter alia, various systems, servers, devices, methods, media, programs, and platforms for providing a reusable, plug and play microservice application to facilitate authenticated file transfers across a plurality of computing platforms and a plurality of storage options.

According to an aspect of the present disclosure, a method for providing an application to facilitate authenticated file transfers across a plurality of computing platforms is disclosed. The method is implemented by at least one processor. The method may include receiving, from a client application, at least one call to perform at least one action, the at least one call may include at least one message to transfer at least one file; validating, by using an identity federation service, the at least one call based on the at least one message; authorizing the at least one call and the client application based on a result of the validating; accessing a networked repository via a secured communication protocol when the at least one call and the client application is authorized; and initiating the at least one action.

In accordance with an exemplary embodiment, the at least one action may include at least one from among a file push action to store the at least one file in the networked repository and a file pull action to retrieve the at least one file from the networked repository.

In accordance with an exemplary embodiment, the at least one message may include at least one from among a token in a header of the at least one message, a name of the at least one file as a query parameter, and the at least one file when the at least one call corresponds to the file push action.

In accordance with an exemplary embodiment, when the at least one call corresponds to the file push action, the method may further include copying the at least one file in the at least one message; writing the copied at least one file to the networked repository; and transmitting, via a communication interface, a status code to the client application in response to the at least one call.

In accordance with an exemplary embodiment, the method may further include dividing the copied at least one file into a plurality of component files based on at least one predetermined criterion, each of the plurality of component files may correspond to a part of the at least one file; and writing each of the plurality of component files to the networked repository, wherein each of the plurality of component files may be simultaneously written to the network repository.

In accordance with an exemplary embodiment, the at least one message may include at least one from among a token in a header of the at least one message and a characteristic of the at least one file as a query parameter when the at least one call corresponds to the file pull action, the characteristic may include at least one from among a name of the at least one file and a location identifier of the at least one file.

In accordance with an exemplary embodiment, when the at least one call corresponds to the file pull action, the method may further include identifying, in the networked repository, the at least one file based on the at least one message; reading the identified at least one file; and transmitting, via a communication interface, a multipart reply to the client application in response to the at least one call.

In accordance with an exemplary embodiment, the at least one file may include at least one from among a list file and an object file, the at least one file may relate to a computer resource for recording data in a computer storage device.

In accordance with an exemplary embodiment, the client application may include an application programming interface that is usable to implement microservice applications in a plurality of different operating systems that are each deployed on a plurality of different networked platforms.

In accordance with an exemplary embodiment, the method may further include detecting an interruption of the at least one action; identifying an interruption point that relates to the at least one action based on the detected interruption; and automatically reinitiating the at least one action at the identified interruption point.

According to an aspect of the present disclosure, a computing device configured to implement an execution of a method for providing an application to facilitate authenticated file transfers across a plurality of computing platforms is disclosed. The computing device comprising a processor; a memory; and a communication interface coupled to each of the processor and the memory, wherein the processor may be configured to receive, from a client application, at least one call to perform at least one action, the at least one call may include at least one message to transfer at least one file; validate, by using an identity federation service, the at least one call based on the at least one message; authorize the at least one call and the client application based on a result of the validating; access a networked repository via a secured communication protocol when the at least one call and the client application is authorized; and initiate the at least one action.

In accordance with an exemplary embodiment, the at least one action may include at least one from among a file push action to store the at least one file in the networked repository and a file pull action to retrieve the at least one file from the networked repository.

In accordance with an exemplary embodiment, the at least one message may include at least one from among a token in a header of the at least one message, a name of the at least one file as a query parameter, and the at least one file when the at least one call corresponds to the file push action.

In accordance with an exemplary embodiment, when the at least one call corresponds to the file push action, the processor may be further configured to copy the at least one file in the at least one message; write the copied at least one file to the networked repository; and transmit, via a communication interface, a status code to the client application in response to the at least one call.

In accordance with an exemplary embodiment, the processor may be further configured to divide the copied at least one file into a plurality of component files based on at least one predetermined criterion, each of the plurality of component files may correspond to a part of the at least one file; and write each of the plurality of component files to the networked repository, wherein each of the plurality of component files may be simultaneously written to the network repository.

In accordance with an exemplary embodiment, the at least one message may include at least one from among a token in a header of the at least one message and a characteristic of the at least one file as a query parameter when the at least one call corresponds to the file pull action, the characteristic may include at least one from among a name of the at least one file and a location identifier of the at least one file.

In accordance with an exemplary embodiment, when the at least one call corresponds to the file pull action, the processor may be further configured to identify, in the networked repository, the at least one file based on the at least one message; read the identified at least one file; and transmit, via a communication interface, a multipart reply to the client application in response to the at least one call.

In accordance with an exemplary embodiment, the at least one file may include at least one from among a list file and an object file, the at least one file may relate to a computer resource for recording data in a computer storage device.

In accordance with an exemplary embodiment, the client application may include an application programming interface that is usable to implement microservice applications in a plurality of different operating systems that are each deployed on a plurality of different networked platforms.

In accordance with an exemplary embodiment, the processor may be further configured to detect an interruption of the at least one action; identify an interruption point that relates to the at least one action based on the detected interruption; and automatically reinitiate the at least one action at the identified interruption point.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

DETAILED DESCRIPTION

Through one or more of its various aspects, embodiments and/or specific features or sub-components of the present disclosure, are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

Figure 1:
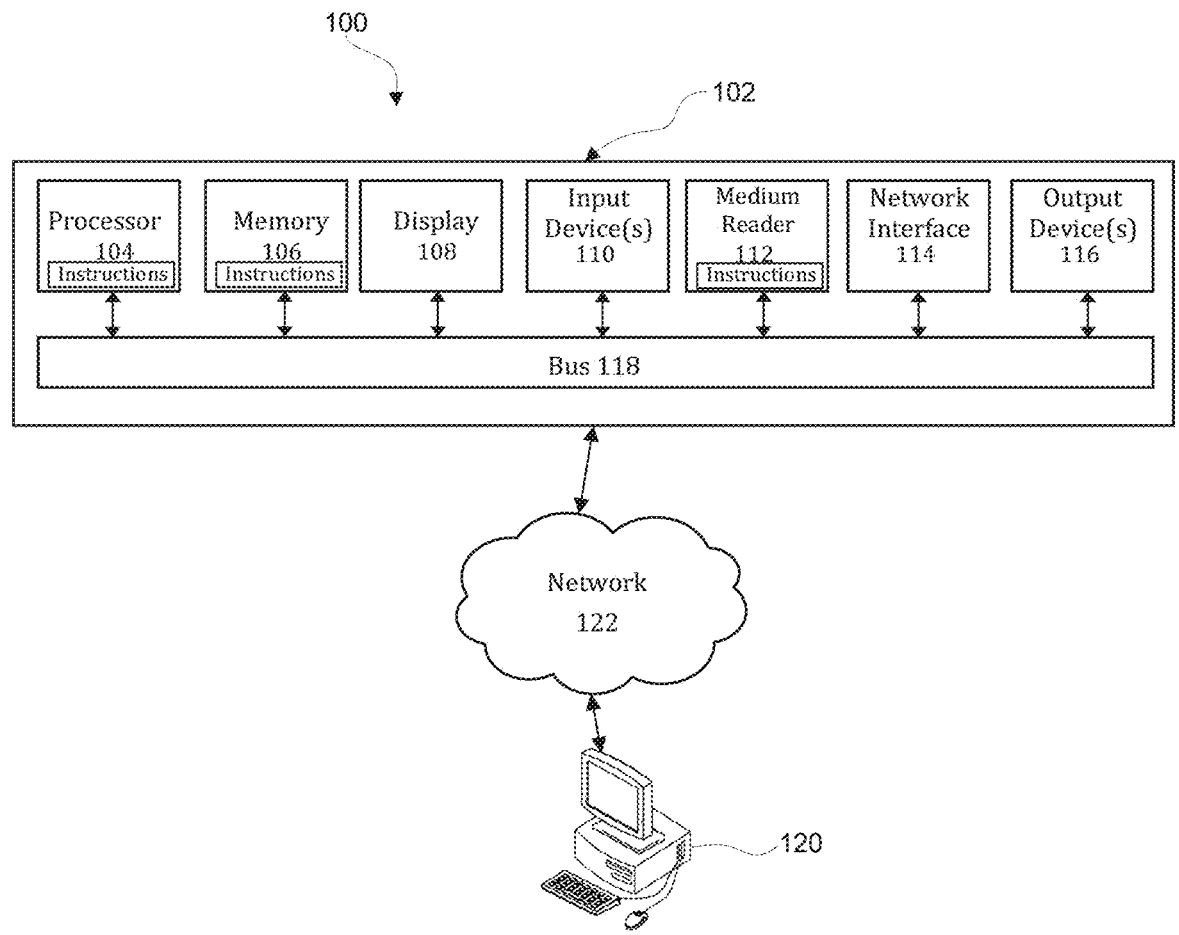
FIG. 1 illustrates an exemplary computer system.

FIG. 1 is an exemplary system for use in accordance with the embodiments described herein. The system 100 is generally shown and may include a computer system 102, which is generally indicated.

The computer system 102 may include a set of instructions that can be executed to cause the computer system 102 to perform any one or more of the methods or computer-based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term "system" shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general-purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data and executable instructions, and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disk read only memory (CD-ROM), digital versatile disk (DVD), floppy disk, blu-ray disk, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a display 108, such as a liquid crystal display (LCD), an organic light emitting diode (OLED), a flat panel display, a solid-state display, a cathode ray tube (CRT), a plasma display, or any other type of display, examples of which are well known to skilled persons.

The computer system 102 may also include at least one input device 110, such as a keyboard, a touch-sensitive input screen or pad, a speech input, a mouse, a remote-control device having a wireless keypad, a microphone coupled to a speech recognition engine, a camera such as a video camera or still camera, a cursor control device, a global positioning system (GPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g., software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 110 during execution by the computer system 102.

Furthermore, the computer system 102 may include any additional devices, components, parts, peripherals, hardware, software, or any combination thereof which are commonly known and understood as being included with or within a computer system, such as, but not limited to, a network interface 114 and an output device 116. The output device 116 may be, but is not limited to, a speaker, an audio out, a video out, a remote-control output, a printer, or any combination thereof.

Each of the components of the computer system 102 may be interconnected and communicate via a bus 118 or other communication link. As shown in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, Bluetooth, Zigbee, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is shown in FIG. 1 as a wireless network, those skilled in the art appreciate that the network 122 may also be a wired network.

The additional computer device 120 is shown in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In accordance with various embodiments of the present disclosure, the methods described herein may be implemented using a hardware computer system that executes software programs. Further, in an exemplary, non-limited embodiment, implementations can include distributed processing, component/object distributed processing, and parallel processing. Virtual computer system processing can be constructed to implement one or more of the methods or functionalities as described herein, and a processor described herein may be used to support a virtual processing environment.

As described herein, various embodiments provide optimized methods and systems for providing a reusable, plug and play microservice application to facilitate authenticated file transfers across a plurality of computing platforms and a plurality of storage options.

Figure 2:
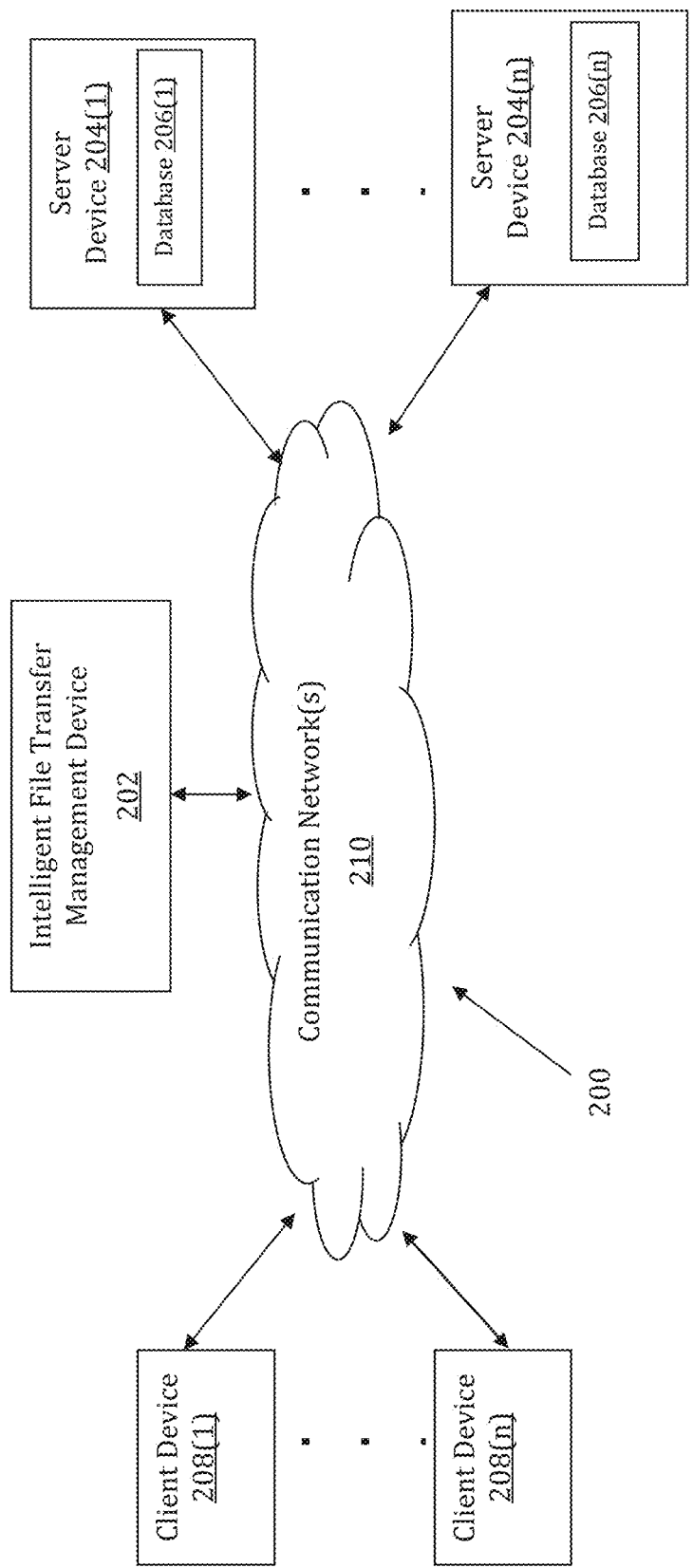
FIG. 2 illustrates an exemplary diagram of a network environment.

Referring to FIG. 2, a schematic of an exemplary network environment 200 for implementing a method for providing a reusable, plug and play microservice application to facilitate authenticated file transfers across a plurality of computing platforms and a plurality of storage options is illustrated. In an exemplary embodiment, the method is executable on any networked computer platform, such as, for example, a personal computer (PC).

The method for providing a reusable, plug and play microservice application to facilitate authenticated file transfers across a plurality of computing platforms and a plurality of storage options may be implemented by an Intelligent File Transfer Management (IFTM) device 202. The IFTM device 202 may be the same or similar to the computer system 102 as described with respect to FIG. 1. The IFTM device 202 may store one or more applications that can include executable instructions that, when executed by the IFTM device 202, cause the IFTM device 202 to perform actions, such as to transmit, receive, or otherwise process network messages, for example, and to perform other actions described and illustrated below with reference to the figures. The application(s) may be implemented as modules or components of other applications. Further, the application(s) can be implemented as operating system extensions, modules, plugins, or the like.

Even further, the application(s) may be operative in a cloud-based computing environment. The application(s) may be executed within or as virtual machine(s) or virtual server(s) that may be managed in a cloud-based computing environment. Also, the application(s), and even the IFTM device 202 itself, may be located in virtual server(s) running in a cloud-based computing environment rather than being tied to one or more specific physical network computing devices. Also, the application(s) may be running in one or more virtual machines (VMs) executing on the IFTM device 202. Additionally, in one or more embodiments of this technology, virtual machine(s) running on the IFTM device 202 may be managed or supervised by a hypervisor.

In the network environment 200 of FIG. 2, the IFTM device 202 is coupled to a plurality of server devices 204(1)-204(n) that hosts a plurality of databases 206(1)-206(n), and also to a plurality of client devices 208(1)-208(n) via communication network(s) 210. A communication interface of the IFTM device 202, such as the network interface 114 of the computer system 102 of FIG. 1, operatively couples and communicates between the IFTM device 202, the server devices 204(1)-204(n), and/or the client devices 208(1)-208(n), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the IFTM device 202, the server devices 204(1)-204(n), and/or the client devices 208(1)-208(n) may be coupled together via other topologies. Additionally, the network environment 200 may include other network devices such as one or more routers and/or switches, for example, which are well known in the art and thus will not be described herein. This technology provides a number of advantages including methods, non-transitory computer readable media, and IFTM devices that efficiently implement a method for providing a reusable, plug and play microservice application to facilitate authenticated file transfers across a plurality of computing platforms and a plurality of storage options.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 210 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The IFTM device 202 may be a standalone device or integrated with one or more other devices or apparatuses, such as one or more of the server devices 204(1)-204(n), for example. In one particular example, the IFTM device 202 may include or be hosted by one of the server devices 204(1)-204(n), and other arrangements are also possible. Moreover, one or more of the devices of the IFTM device 202 may be in a same or a different communication network including one or more public, private, or cloud networks, for example.

The plurality of server devices 204(1)-204(n) may be the same or similar to the computer system 102 or the computer device 120 as described with respect to FIG. 1, including any features or combination of features described with respect thereto. For example, any of the server devices 204(1)-204(n) may include, among other features, one or more processors, a memory, and a communication interface, which are coupled together by a bus or other communication link, although other numbers and/or types of network devices may be used. The server devices 204(1)-204(n) in this example may process requests received from the IFTM device 202 via the communication network(s) 210 according to the HTTP-based and/or JavaScript Object Notation (JSON) protocol, for example, although other protocols may also be used.

The server devices 204(1)-204(n) may be hardware or software or may represent a system with multiple servers in a pool, which may include internal or external networks. The server devices 204(1)-204(n) hosts the databases 206(1)-206(n) that are configured to store data that relates to calls, messages, computer files, computer objects, computer blocks, and tokens.

Although the server devices 204(1)-204(n) are illustrated as single devices, one or more actions of each of the server devices 204(1)-204(n) may be distributed across one or more distinct network computing devices that together comprise one or more of the server devices 204(1)-204(n). Moreover, the server devices 204(1)-204(n) are not limited to a particular configuration. Thus, the server devices 204(1)-204(n) may contain a plurality of network computing devices that operate using a master/slave approach, whereby one of the network computing devices of the server devices 204(1)-204(n) operates to manage and/or otherwise coordinate operations of the other network computing devices.

The server devices 204(1)-204(n) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices 208(1)-208(n) may also be the same or similar to the computer system 102 or the computer device 120 as described with respect to FIG. 1, including any features or combination of features described with respect thereto. For example, the client devices 208(1)-208(n) in this example may include any type of computing device that can interact with the IFTM device 202 via communication network(s) 210. Accordingly, the client devices 208(1)-208(n) may be mobile computing devices, desktop computing devices, laptop computing devices, tablet computing devices, virtual machines (including cloud-based computers), or the like, that host chat, e-mail, or voice-to-text applications, for example. In an exemplary embodiment, at least one client device 208 is a wireless mobile communication device, i.e., a smart phone.

The client devices 208(1)-208(n) may run interface applications, such as standard web browsers or standalone client applications, which may provide an interface to communicate with the IFTM device 202 via the communication network(s) 210 in order to communicate user requests and information. The client devices 208(1)-208(n) may further include, among other features, a display device, such as a display screen or touchscreen, and/or an input device, such as a keyboard, for example.

Although the exemplary network environment 200 with the IFTM device 202, the server devices 204(1)-204(n), the client devices 208(1)-208(n), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 200, such as the IFTM device 202, the server devices 204(1)-204(n), or the client devices 208(1)-208(n), for example, may be configured to operate as virtual instances on the same physical machine. In other words, one or more of the IFTM device 202, the server devices 204(1)-204(n), or the client devices 208(1)-208(n) may operate on the same physical device rather than as separate devices communicating through communication network(s) 210. Additionally, there may be more or fewer IFTM devices 202, server devices 204(1)-204(n), or client devices 208(1)-208(n) than illustrated in FIG. 2.

In addition, two or more computing systems or devices may be substituted for any one of the systems or devices in any example. Accordingly, principles and advantages of distributed processing, such as redundancy and replication, also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
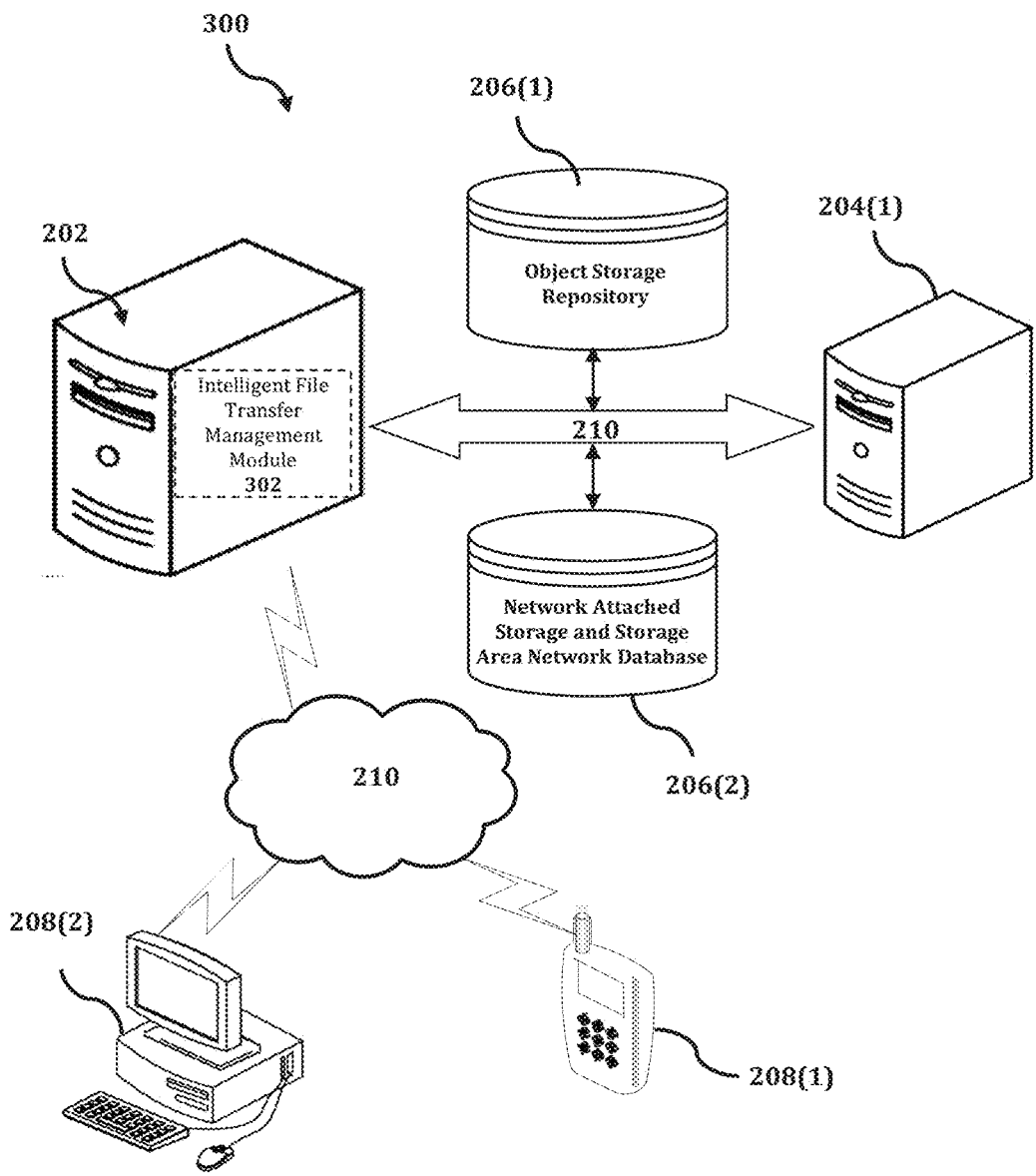
FIG. 3 shows an exemplary system for implementing a method for providing a reusable, plug and play microservice application to facilitate authenticated file transfers across a plurality of computing platforms and a plurality of storage options.

The IFTM device 202 is described and shown in FIG. 3 as including an intelligent file transfer management module 302, although it may include other rules, policies, modules, databases, or applications, for example. As will be described below, the intelligent file transfer management module 302 is configured to implement a method for providing a reusable, plug and play microservice application to facilitate authenticated file transfers across a plurality of computing platforms and a plurality of storage options.

An exemplary process 300 for implementing a mechanism for providing a reusable, plug and play microservice application to facilitate authenticated file transfers across a plurality of computing platforms and a plurality of storage options by utilizing the network environment of FIG. 2 is shown as being executed in FIG. 3. Specifically, a first client device 208(1) and a second client device 208(2) are illustrated as being in communication with IFTM device 202. In this regard, the first client device 208(1) and the second client device 208(2) may be "clients" of the IFTM device 202 and are described herein as such. Nevertheless, it is to be known and understood that the first client device 208(1) and/or the second client device 208(2) need not necessarily be "clients" of the IFTM device 202, or any entity described in association therewith herein. Any additional or alternative relationship may exist between either or both of the first client device 208(1) and the second client device 208(2) and the IFTM device 202, or no relationship may exist.

Further, IFTM device 202 is illustrated as being able to access an object storage repository 206(1) and a network attached storage and storage area network database 206(2). The intelligent file transfer management module 302 may be configured to access these databases for implementing a method for providing a reusable, plug and play microservice application to facilitate authenticated file transfers across a plurality of computing platforms and a plurality of storage options.

The first client device 208(1) may be, for example, a smart phone. Of course, the first client device 208(1) may be any additional device described herein. The second client device 208(2) may be, for example, a personal computer (PC). Of course, the second client device 208(2) may also be any additional device described herein.

The process may be executed via the communication network(s) 210, which may comprise plural networks as described above. For example, in an exemplary embodiment, either or both of the first client device 208(1) and the second client device 208(2) may communicate with the IFTM device 202 via broadband or cellular communication. Of course, these embodiments are merely exemplary and are not limiting or exhaustive.

Upon being started, the intelligent file transfer management module 302 executes a process for providing a reusable, plug and play microservice application to facilitate authenticated file transfers across a plurality of computing platforms and a plurality of storage options. An exemplary process for providing a reusable, plug and play microservice application to facilitate authenticated file transfers across a plurality of computing platforms and a plurality of storage options is generally indicated at flowchart 400 in FIG. 4.

Figure 4:
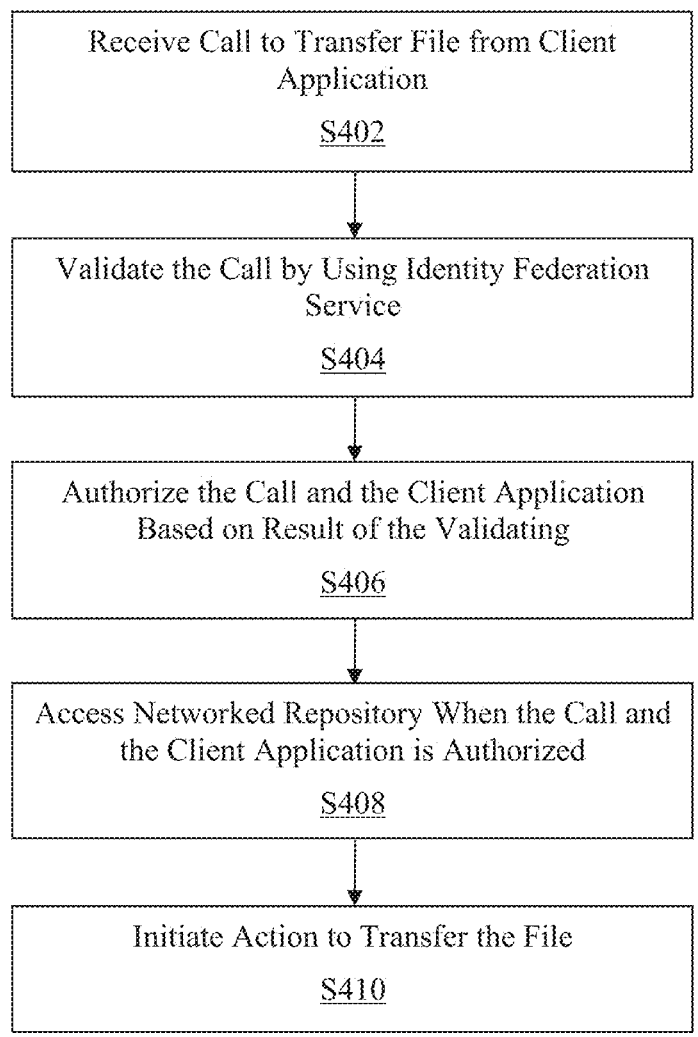
FIG. 4 is a flowchart of an exemplary process for implementing a method for providing a reusable, plug and play microservice application to facilitate authenticated file transfers across a plurality of computing platforms and a plurality of storage options.

In the process 400 of FIG. 4, at step S402, a call such as, for example, a method call, a remote procedure call (RPC), and a function call to perform an action may be received from a client application. The call may include a message to transfer a file. In an exemplary embodiment, the action may include at least one from among a file push action to store the file and a file pull action to retrieve the file. For example, a file push action may include the client application uploading the file to another application as well as to a networked repository. Similarly, a file pull action may include the client application reading the file and/or file names from the networked repository.

In another exemplary embodiment, the client application may include an application programming interface (API) that is usable to implement microservice applications in a plurality of different operating systems that are each deployed on a plurality of different networked platforms. The API may correspond to a computing interface that defines interactions between multiple software intermediaries. The API may define the kinds of calls and/or requests that can be made, how to make them, the data formats that should be used, and the conventions to follow.

In another exemplary embodiment, the API may support a variety of operating systems such as, for example, a LINUX operating system and a WINDOWS operating system. Additionally, the API may be hosted on a variety of computing platforms such as, for example, a private cloud platform and a public cloud platform. In another exemplary embodiment, the API may correspond to a representational state transfer (REST) standard for a software architecture of interactive applications that uses web services. The API may be used by applications for sending and receiving files via a reusable, plug and play microservice consistent with present disclosures.

In another exemplary embodiment, the application may include at least one from among a monolithic application and a microservice application. The monolithic application may describe a single-tiered software application where the user interface and data access code are combined into a single program from a single platform. The monolithic application may be self-contained and independent from other computing applications.

In another exemplary embodiment, a microservice application may include a unique service and a unique process that communicates with other services and processes over a network to fulfill a goal. The microservice application may be independently deployable and organized around business capabilities. In another exemplary embodiment, the microservices may relate to a software development architecture such as, for example, an event-driven architecture made up of event producers and event consumers in a loosely coupled choreography. The event producer may detect or sense an event such as, for example, a significant occurrence or change in state for system hardware or software and represent the event as a message. The event message may then be transmitted to the event consumer via event channels for processing. In another exemplary embodiment, the event-driven architecture may include a distributed data streaming platform such as, for example, an APACHE KAFKA platform for the publishing, subscribing, storing, and processing of event streams in real time. As will be appreciated by a person of ordinary skill in the art, each microservice in a microservice choreography may perform corresponding actions independently and may not require any external instructions.

In another exemplary embodiment, microservices may relate to a software development architecture such as, for example, a service-oriented architecture which arranges a complex application as a collection of coupled modular services. The modular services may include small, independently versioned, and scalable customer-focused services with specific business goals. The services may communicate with other services over standard protocols with well-defined interfaces. In another exemplary embodiment, the microservices may utilize technology-agnostic communication protocols such as, for example, a Hypertext Transfer Protocol (HTTP) to communicate over a network and may be implemented by using different programming languages, databases, hardware environments, and software environments.

In another exemplary embodiment, messaging may include a process of communication between software components or between applications. A messaging system may include a peer-to-peer facility such that a messaging client may send messages to, and receive messages from, any other client. Each messaging client may connect to a messaging agent that provides facilities for creating, sending, receiving, and reading messages. In another exemplary embodiment, messaging may enable distributed communication that is loosely coupled. A component may send a message to a destination, and the recipient may retrieve the message from the destination, which enables communication between the sender and the receiver even when the sender and the receiver are not available at the same time.

In another exemplary embodiment, the message may be communicated synchronously and asynchronously between software components. In asynchronous communication, a software component may put a message in a message queue and continues processing without requiring an immediate response. In synchronous communication, the software component sends the message to another software component and waits for a response before continuing to process the next set of instructions.

In another exemplary embodiment, the message may include at least one from among a token in a header of the message, a name of the file as a query parameter, and the file when the call corresponds to the file push action. For example, to request a file upload, the client application may transmit a call message that includes a token in the header of the call message, a name of the file as the query parameter, and the file itself.

In another exemplary embodiment, the message may include at least one from among a token in a header of the message and a characteristic of the file as a query parameter when the call corresponds to the file pull action. The characteristic of the file may include at least one from among a name of the file and a location identifier of the file. For example, to read a file in storage, the client application may transmit a call message that includes a token in a header of the message, a file name, and a root/folder name as the query parameter.

In another exemplary embodiment, the file may relate to a computer resource for recording data in a computer storage device and may include at least one from among a list file and an object file. The file may include various types of computer resources that are designed to store various types of data such as, for example, pictures, written messages, videos, and computer programs. As will be appreciated by a person of ordinary skill in the art, the file may be edited and transferred electronically through a network such as, for example, the internet.

At step S404, the received call may be validated by using an identity federation service based on information in the message. The received call may be validated by using identifiers such as, for example, a token as well as application information such as, for example, application role information that is contained in the call message. In an exemplary embodiment, the identifiers and application information in the call may be validated based on a comparison of the information in the call and known federated identity information.

In another exemplary embodiment an identity federation service such as, for example, an active directory federation service (ADFS) may be utilized to validate the information in the call. The identity federation service may enable single sign-on access to systems and applications across organizational boundaries for users. In another exemplary embodiment, the identity federation service may utilize a claims-based access-control authorization model to maintain application security and to implement federated identity. Claims-based authentication may correspond to a process by which a user is authenticated based on a set of claims about the identity of the user. The identity of the user may be contained in a trusted token which is signed by an entity that has previously authenticated the user by other methodologies. As will be appreciated by a person of ordinary skill in the art, the incorporation of the identity federation service enables applications across organizational boundaries to utilize API authentication methodologies such as, for example, an OAUTH2 authentication methodology to securely communicate and transfer files.

At step S406, the call and the client application may be authorized based on a result of the validating. The action in the call may be authorized based on a result of the validation process for the call and the client application. For example, based on a positive validation response from the identity federation service, the action requested by the client application may be authorized and the action delegated. In another exemplary embodiment, when the call and the client application is not validated by the identity federation service, a response may be transmitted to the client application. The response may include information relating to a negative validation response from the identity federation service. For example, the response may include information indicating that the token in the call has expired and/or invalid.

At step S408, a networked repository may be accessed via a secured communication protocol when the call and the client application has been authorized. The networked repository may include an object storage repository and a disk storage repository. In an exemplary embodiment, the object storage repository may include a container such as, for example, a bucket for storing objects in a compartment within an object storage namespace. The bucket may be associated with a single compartment which utilizes policies to indicate what actions can be performed on the bucket as well as all the objects in the bucket. In another exemplary embodiment, the disk storage repository may include a file-level computer data storage server such as, for example, a network-attached storage (NAS) and a block-level computer data storage server such as, for example, storage area network (SAN).

In another exemplary embodiment, the networked repository may be accessed via a secured communication protocol such as, for example, a hypertext transfer protocol secure (HTTPS) extension. The secured communication protocol may be used for secure communication over a computer network. The communication protocol may be encrypted by a cryptographic protocol such as, for example, a transport layer security (TLS) protocol that is designed to provide communications security over a computer network.

At step S410, the action may be initiated in response to the call. In an exemplary embodiment, the action may be initiated via a delegation of the request to a file manipulation service such as, for example, a smart file writer, a smart file reader, an object store file writer, and an object store file reader. The file manipulation service may interact with the networked repository to perform the requested action. In another exemplary embodiment, after performance of the requested action, the file manipulation service may transmit a status to the client application. For example, the file manipulation service may transmit a "201 created" success status response code to the client application to indicate that the request has succeeded and has led to the creation of a resource.

In another exemplary embodiment, when the call corresponds to the file push action, the file in the received message may first be copied. The file may be copied by a device such as, for example, an intelligent file transfer management device consistent with present disclosures. The copied file may then be written to the networked repository and a status code may be transmitted via a communication interface to the client application in response to the call.

In another exemplary embodiment, when the call corresponds to the file push action, the file may be split into multiple parts to facilitate multipart uploads. The copied file may be divided into a plurality of component files based on predetermined criteria. The copied file may be divided such that each of the plurality of component files corresponds to a part of the file. Each of the plurality of component files may then be written to the networked repository and recombined back into the copied file. In another exemplary embodiment, each of the plurality of component files is simultaneously written to the network repository. As will be appreciated by a person of ordinary skill in the art, the simultaneous uploading of each of the component files for later recombination enables upload speed improvements for the transfer of the file when compared to the upload of the file as a single data unit.

In another exemplary embodiment, when the call corresponds to the file pull action, the file may first be identified in the networked repository based on information in the message. The identified file may be read by a device such as, for example, an intelligent file transfer management device consistent with present disclosures. Then, a multipart reply to the client application may be transmitted via a communication interface in response to the call.

In another exemplary embodiment, the transfer of the file may be automatically reinitiated when an interruption occurs in the transfer process. When an interruption of the action is detected by a device such as, for example, an intelligent file transfer management device consistent with present disclosures, an interruption point that relates to the action may be identified based on the detected interruption. Then, the action may be automatically reinitiated at the identified interruption point. In another exemplary embodiment, information relating to the file, the detected interruption, and the automatic reinitiating of the action may be documented in an electronic record such as, for example, a log file.

In another exemplary embodiment, an alert may be displayed for a user via a graphical user interface when an interruption of the action is detected. The alert may include information that relates to the file such as, for example, the file name and interruption point as well as information that relates to the detected interruption such as, for example, a cause of the interruption. In another exemplary embodiment, the alert may include information to manually reinitiate the action via a graphical element on the graphical user interface. The graphical element on the graphical user interface may be configured to receive input from the user.

In another exemplary embodiment, application teams may utilize features such as, for example, a landing zones feature, a file archival feature, a smart mover client feature, a smart mover script feature. The landing zones feature helps store files from multiple clients to appropriate client folders. The landing zones feature creates a client specific folder and stores the corresponding files, respectively. The file archival feature helps to archive the files to archived folders after reading. The smart mover client feature may split files for parallel upload, define retry logic with a retry template, and authenticate with a federated identity service by using a REST template. The smart mover script feature may include a shell script to help transfer the files. The smart mover script feature may iteratively transfer all files within a folder.

In another exemplary embodiment, multithreaded file transfers may be utilized to transfer multiple files. Multithreaded file transfers enable more than one file to be transferred at a time per route. In another exemplary embodiment, the file may be transferred to multiple pools when initiated. For example, the client application may upload the file to several pools simultaneously. In another exemplary embodiment, intelligent APIs may be utilized to automatically route traffic across pools. For example, when a pool address changes from one server to another, the intelligent APIs may automatically route file transfer traffic accordingly.

Figure 5:
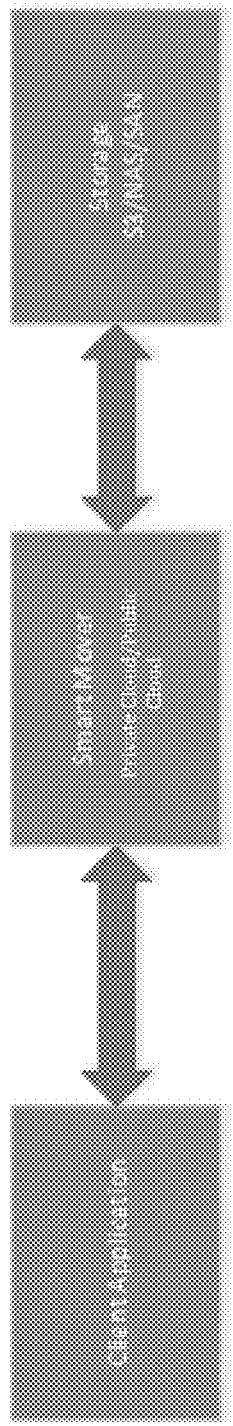
FIG. 5 is a flow diagram of an exemplary implementation of a method for providing a reusable, plug and play microservice application to facilitate authenticated file transfers across a plurality of computing platforms and a plurality of storage options.

FIG. 5 is a flow diagram 500 of an exemplary implementation of a method for providing a reusable, plug and play microservice application to facilitate authenticated file transfers across a plurality of computing platforms and a plurality of storage options. The reusable, plug and play microservice titled "smart mover" may be implemented on a variety of networked environments such as, for example, a private cloud environment and a public cloud environment. The flexible implementation options enable easy deployment of the smart mover on various platforms to expose endpoints for client applications.

As illustrated in FIG. 5, the smart mover may communicate with a client application and various types of networked storage such as, for example, S3 object storage, NAS storage, and SAN storage to facilitate file transfers. The smart mover may utilize an active directory federation service to authenticate and to authorize the application clients based on application roles. Upon successful authentication, the smart mover may process the requests to store the files to a desired storage option as well as process the requests to read/list the files. In an exemplary embodiment, the smart mover may support authentication methodologies such as, for example, the OAUTH2 authentication methodology.

Figure 6:
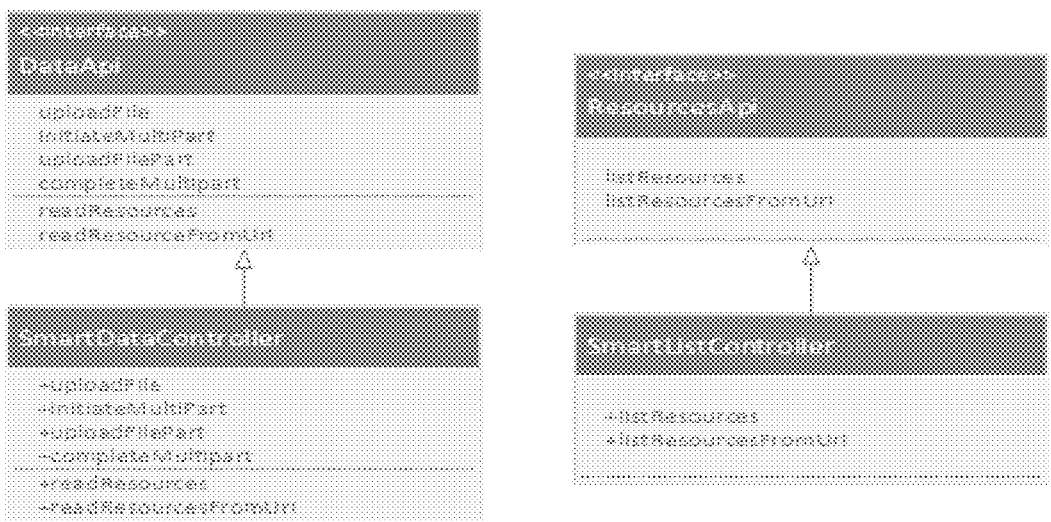
FIG. 6 is a class diagram that illustrates high-level classes and functionalities that are usable for implementing a method for providing a reusable, plug and play microservice application to facilitate authenticated file transfers across a plurality of computing platforms and a plurality of storage options, according to an exemplary embodiment.

FIG. 6 is a class diagram 600 that illustrates high-level classes and functionalities that are usable for implementing a method for providing a reusable, plug and play microservice application to facilitate authenticated file transfers across a plurality of computing platforms and a plurality of storage options, according to an exemplary embodiment.

As illustrated in FIG. 6, the high-level classes may include a DataAPI class, a SmartDataController class, a ResourceAPI class, and a SmartListController class. The DataAPI class may include an interface with the API method definitions for upload and read files. The SmartDataController class may include method implementations for upload and read files as well as delegate the request to a service layer. The SmartDataController class may also support multi-threaded uploading. The ResourceAPI may include an interface with the API method definitions for listing files. The SmartListController class may include method implementations for listing files as well as delegate the request to a service layer.

Figure 7A:
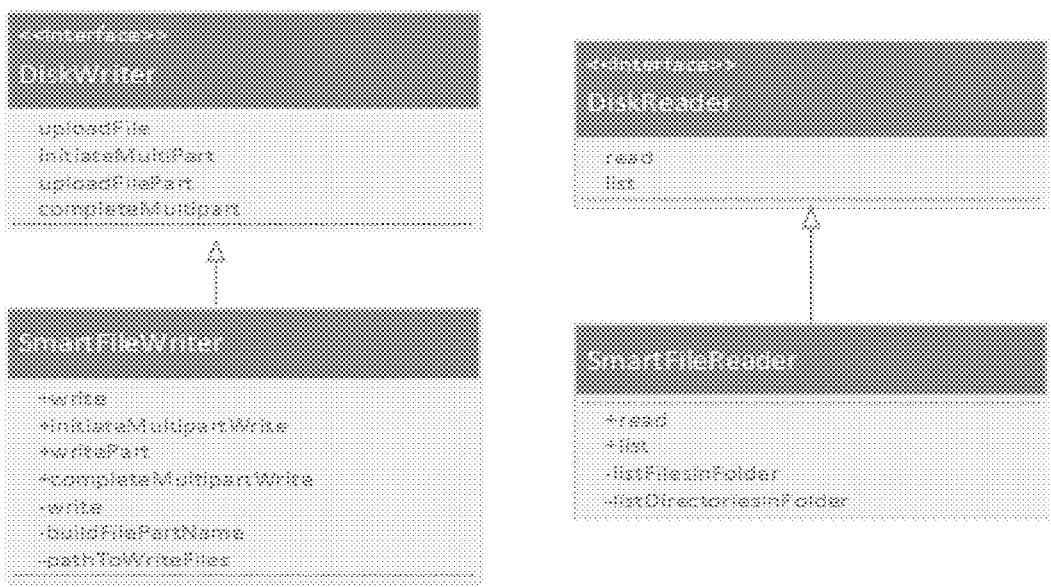
FIG. 7A is a class diagram that illustrates low-level, disk storage classes and functionalities that are usable for implementing a method for providing a reusable, plug and play microservice application to facilitate authenticated file transfers across a plurality of computing platforms and a plurality of storage options, according to an exemplary embodiment.

FIG. 7A is a class diagram 700A that illustrates low-level, disk storage classes and functionalities that are usable for implementing a method for providing a reusable, plug and play microservice application to facilitate authenticated file transfers across a plurality of computing platforms and a plurality of storage options, according to an exemplary embodiment.

As illustrated in FIG. 7A, low-level disk storage classes may include APIs to store the files to networked disk storage such as, for example, NAS storage and SAN storage. The low-level disk storage classes may include a DiskWriter class, a SmartFileWriter class, a DiskReader class, and a SmartFileReader class. The DiskWriter class may include an interface with method definitions for writing data to disk. The SmartFileWriter class may utilize spring stream utility to write files to disk storage. The DiskReader class may include an interface with method definitions to read data from disk. The SmartFileReader class may be responsible for reading/listing the files from disk storage.

Figure 7B:
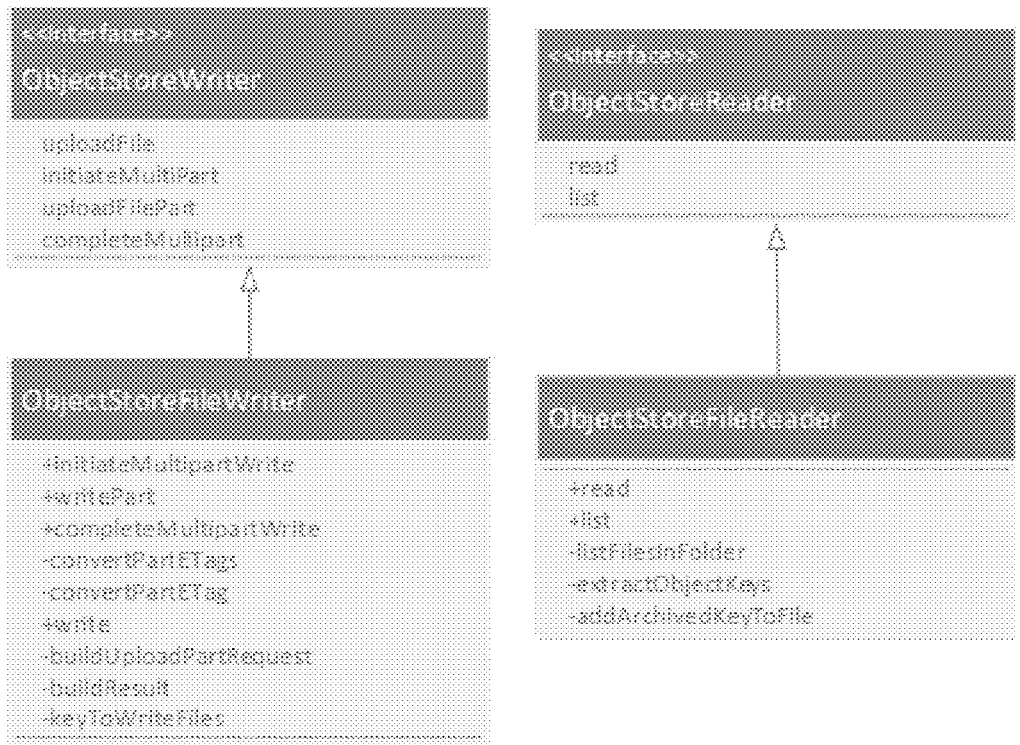
FIG. 7B is a class diagram that illustrates low-level, object storage classes and functionalities that are usable for implementing a method for providing a reusable, plug and play microservice application to facilitate authenticated file transfers across a plurality of computing platforms and a plurality of storage options, according to an exemplary embodiment.

FIG. 7B is a class diagram 700B that illustrates low-level, object storage classes and functionalities that are usable for implementing a method for providing a reusable, plug and play microservice application to facilitate authenticated file transfers across a plurality of computing platforms and a plurality of storage options, according to an exemplary embodiment.

As illustrated in FIG. 7B, low-level object storage classes may include APIs to store the files to object storage options such as, for example, S3 object storage, NEPTUNE object storage, and MERCURY object storage. The low-level object storage classes may include an ObjectStoreWriter class, an ObjectStoreFileWriter class, an ObjectStoreReader class, and an ObjectStoreFileReader class. The ObjectStoreWriter class may include an interface with method definitions for writing data to object store. The ObjectStoreFileWriter class may utilize corresponding software development kits (SDKs) to write files to object store. The ObjectStoreReader class may include an interface with method definitions to read data from object store. The ObjectStoreFileReader class may be responsible for reading/listing the files from object storage.

Figure 8:
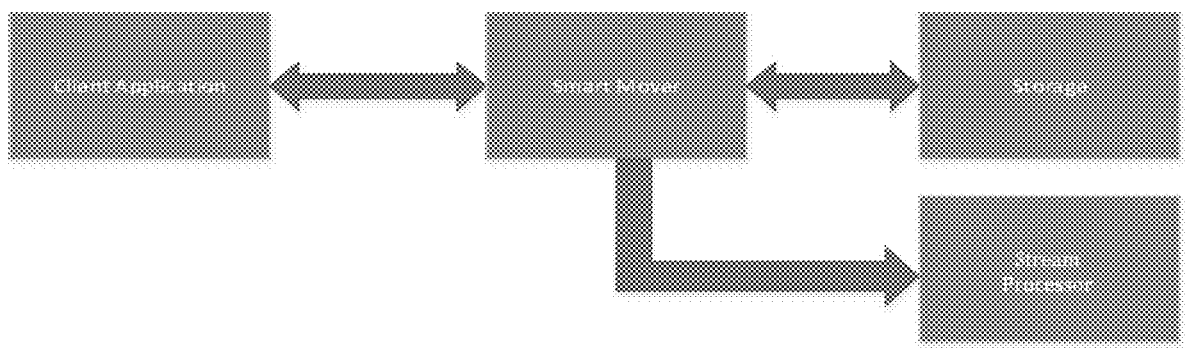
FIG. 8 is a flow diagram of an exemplary message publishing process for implementing a method for providing a reusable, plug and play microservice application to facilitate authenticated file transfers across a plurality of computing platforms and a plurality of storage options.

FIG. 8 is a flow diagram 800 of an exemplary message publishing process for implementing a method for providing a reusable, plug and play microservice application to facilitate authenticated file transfers across a plurality of computing platforms and a plurality of storage options.

As illustrated in FIG. 8, the reusable, plug and play microservice titled "smart mover" may be implemented to communicate with a client application, storage options, as well as a stream processor such as, for example, a KAFKA stream processor. In an exemplary embodiment, this integration with a stream processor enables the publishing of messages to the stream processor. Client applications may consume messages to verify whether the operation has succeeded. Different events may be published to stream processor topics. The published messages may contain file information such as, for example, a file name, a file size, a trace identifier, a development team identifier, a client application identifier, a type of operation (e.g., write operation, read operation, and list operation), and an exception where applicable.

Figure 9A:
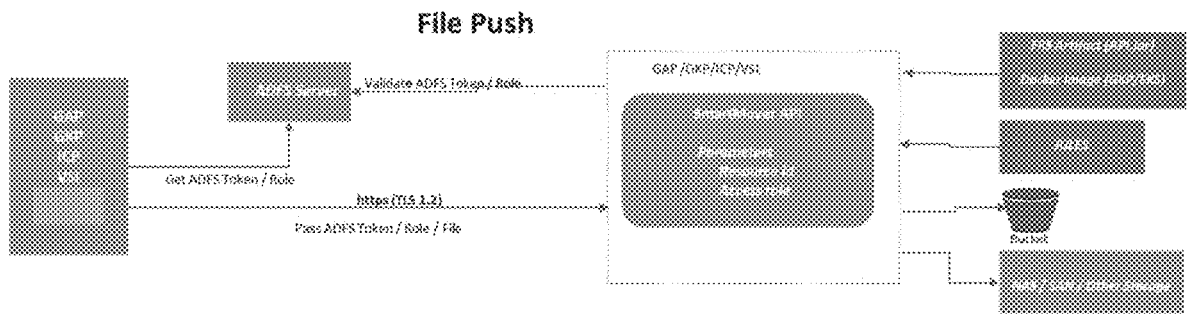
FIG. 9A is a flow diagram that illustrates an internal file push process that is usable for implementing a method for providing a reusable, plug and play microservice application to facilitate authenticated file transfers across a plurality of computing platforms and a plurality of storage options, according to an exemplary embodiment.

FIG. 9A is a flow diagram 900A that illustrates an internal file push process that is usable for implementing a method for providing a reusable, plug and play microservice application to facilitate authenticated file transfers across a plurality of computing platforms and a plurality of storage options, according to an exemplary embodiment. As illustrated in FIG. 9A, the file push action may be initiated by a client application within the same networked environment as the networked repository. The file push action may be initiated to upload a file to the networked repository.

Figure 9B:
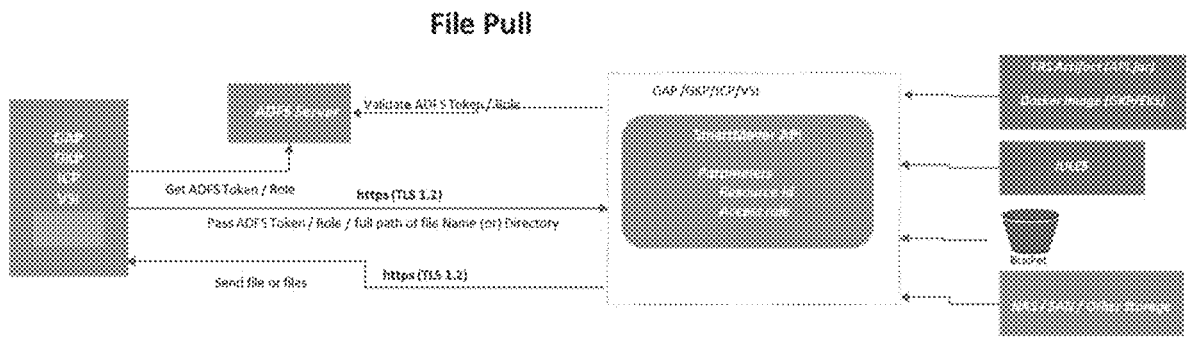
FIG. 9B is a flow diagram that illustrates an internal file pull process that is usable for implementing a method for providing a reusable, plug and play microservice application to facilitate authenticated file transfers across a plurality of computing platforms and a plurality of storage options, according to an exemplary embodiment.

FIG. 9B is a flow diagram 900B that illustrates an internal file pull process that is usable for implementing a method for providing a reusable, plug and play microservice application to facilitate authenticated file transfers across a plurality of computing platforms and a plurality of storage options, according to an exemplary embodiment. As illustrated in FIG. 9B, the file pull action may be initiated by a client application within the same networked environment as the networked repository. The file pull action may be initiated to read and/or list a file from the networked repository.

Figure 10A:
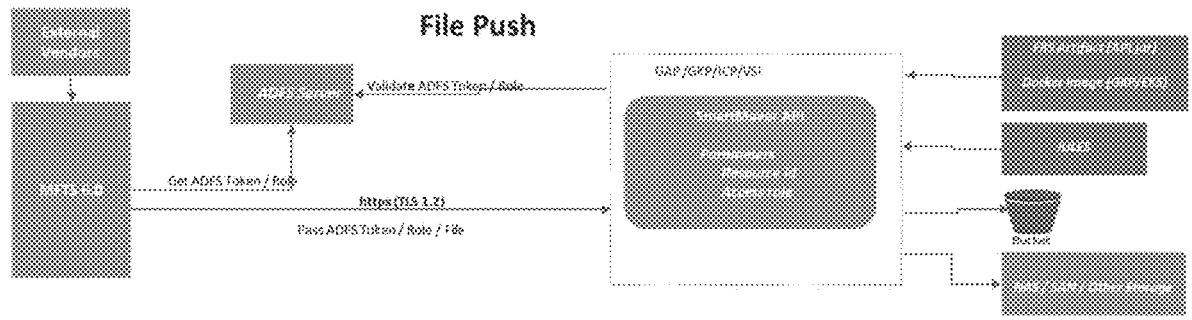
FIG. 10A is a flow diagram that illustrates an external file push process that is usable for implementing a method for providing a reusable, plug and play microservice application to facilitate authenticated file transfers across a plurality of computing platforms and a plurality of storage options, according to an exemplary embodiment.

FIG. 10A is a flow diagram 1000A that illustrates an external file push process that is usable for implementing a method for providing a reusable, plug and play microservice application to facilitate authenticated file transfers across a plurality of computing platforms and a plurality of storage options, according to an exemplary embodiment. As illustrated in FIG. 10A, the file push action may be initiated by an external client application that is in a different networked environment as the networked repository. The file push action may be initiated to upload an external file to the networked repository from outside of an organizational boundary.

Figure 10B:
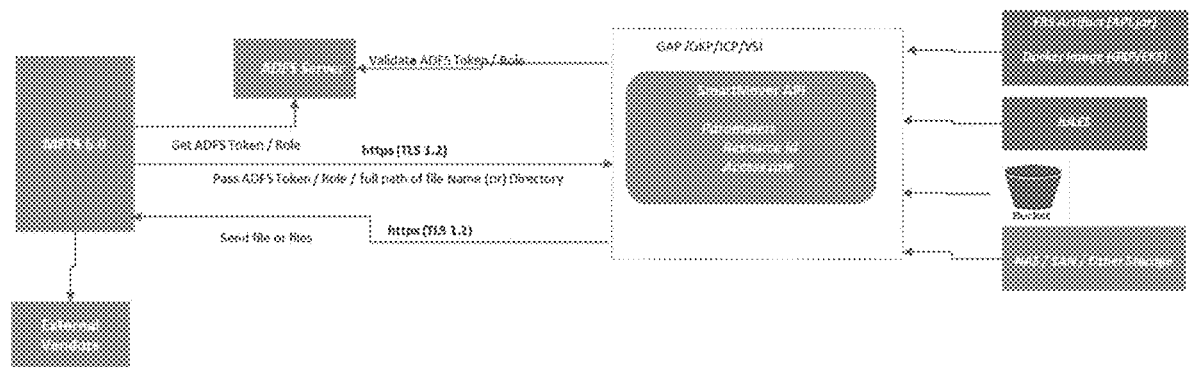
FIG. 10B is a flow diagram that illustrates an external file pull process that is usable for implementing a method for providing a reusable, plug and play microservice application to facilitate authenticated file transfers across a plurality of computing platforms and a plurality of storage options, according to an exemplary embodiment.

FIG. 10B is a flow diagram 1000B that illustrates an external file pull process that is usable for implementing a method for providing a reusable, plug and play microservice application to facilitate authenticated file transfers across a plurality of computing platforms and a plurality of storage options, according to an exemplary embodiment. As illustrated in FIG. 10B, the file pull action may be initiated by an external client application that is in a different networked environment as the networked repository. The file pull action may be initiated from outside of an organizational boundary to read and/or list a file from the networked repository.

Figure 11:
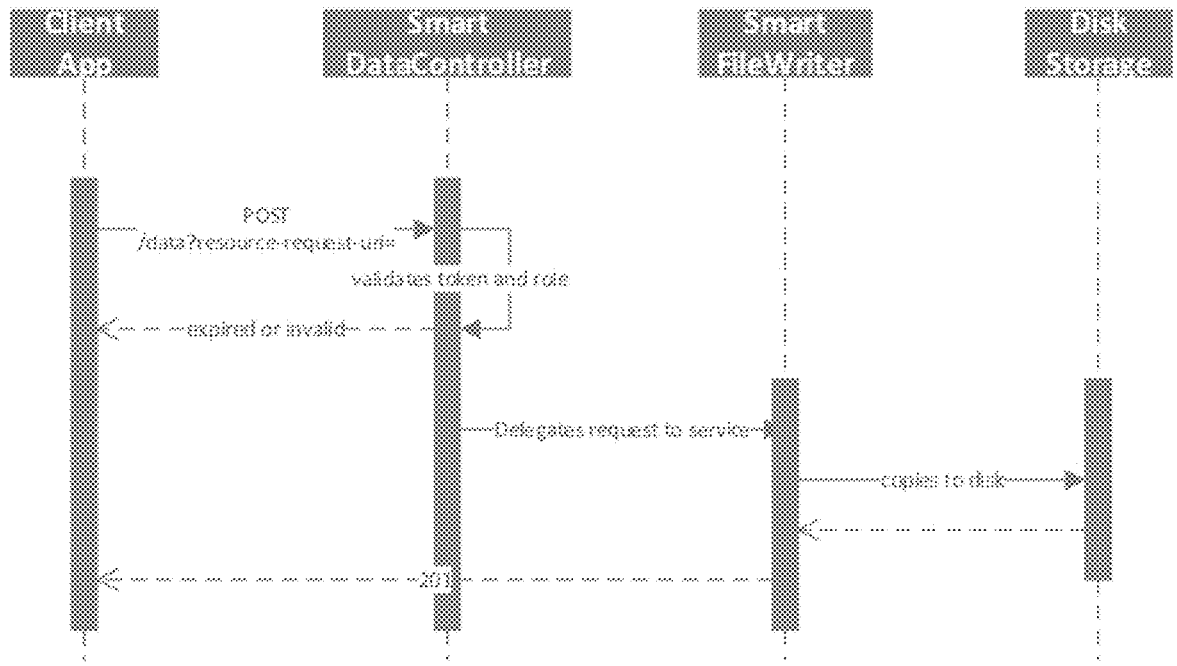
FIG. 11 is a sequence diagram that illustrates an upload file to disk storage process that is usable for implementing a method for providing a reusable, plug and play microservice application to facilitate authenticated file transfers across a plurality of computing platforms and a plurality of storage options, according to an exemplary embodiment.

FIG. 11 is a sequence diagram 1100 that illustrates an upload file to disk storage process that is usable for implementing a method for providing a reusable, plug and play microservice application to facilitate authenticated file transfers across a plurality of computing platforms and a plurality of storage options, according to an exemplary embodiment. As illustrated in FIG. 11, the client application transmits a "POST" request call with a token in the header, a file name as a query parameter, and a file in the request body. The SmartDataController may validate the token and authorize the client application based on the role. The SmartDataController may delegate the request to a SmartFileWriter when the authorization is successful. Then, the SmartFileWriter may copy the file to the disk storage and return a status code response.

Figure 12:
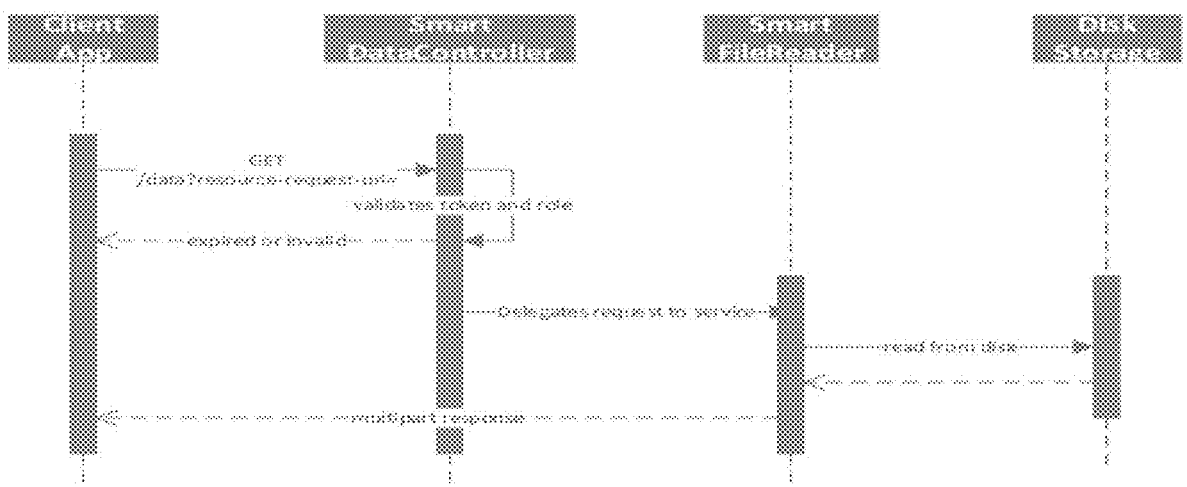
FIG. 12 is a sequence diagram that illustrates a read file from disk storage process that is usable for implementing a method for providing a reusable, plug and play microservice application to facilitate authenticated file transfers across a plurality of computing platforms and a plurality of storage options, according to an exemplary embodiment.

FIG. 12 is a sequence diagram 1200 that illustrates a read file from disk storage process that is usable for implementing a method for providing a reusable, plug and play microservice application to facilitate authenticated file transfers across a plurality of computing platforms and a plurality of storage options, according to an exemplary embodiment. As illustrated in FIG. 12, the client application transmits a "GET" request call with a token in the header and a file name and/or a root name/folder name as a query parameter. The SmartDataController may validate the token and authorize the client application based on the role. The SmartDataController may delegate the request to a SmartFileReader when the authorization is successful. Then, the SmartFileReader may read the file from disk storage and return a multipart response.

Figure 13:
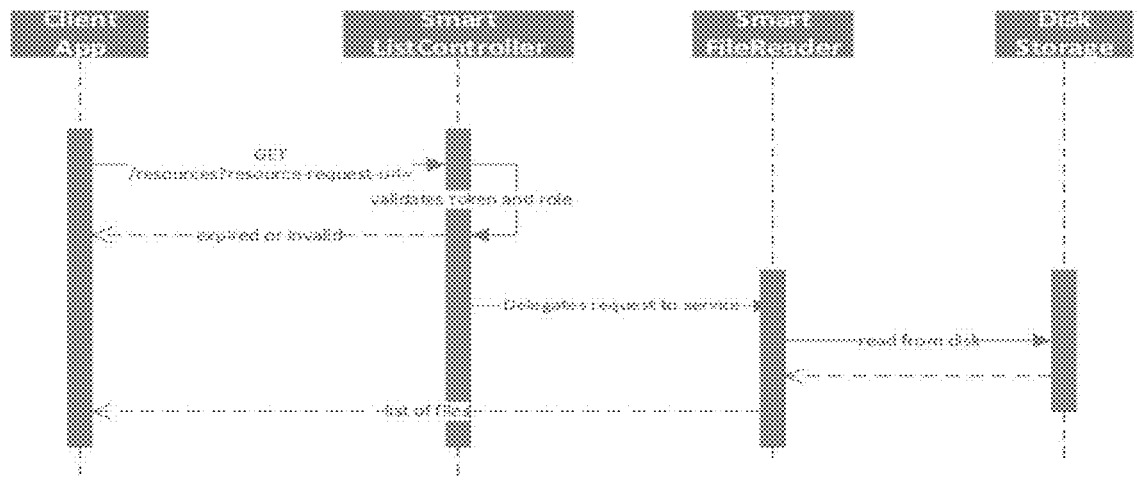
FIG. 13 is a sequence diagram that illustrates a read list file from disk storage process that is usable for implementing a method for providing a reusable, plug and play microservice application to facilitate authenticated file transfers across a plurality of computing platforms and a plurality of storage options, according to an exemplary embodiment.

FIG. 13 is a sequence diagram 1300 that illustrates a read list file from disk storage process that is usable for implementing a method for providing a reusable, plug and play microservice application to facilitate authenticated file transfers across a plurality of computing platforms and a plurality of storage options, according to an exemplary embodiment. As illustrated in FIG. 13, the client application transmits a "GET" request call with a token in the header and a file name and/or a root name/folder name as a query parameter. The SmartListController may validate the token and authorize the client application based on the role. The SmartListController may delegate the request to a SmartFileReader when the authorization is successful. Then, the SmartFileReader may read the file names from disk storage and return a list.

Figure 14:
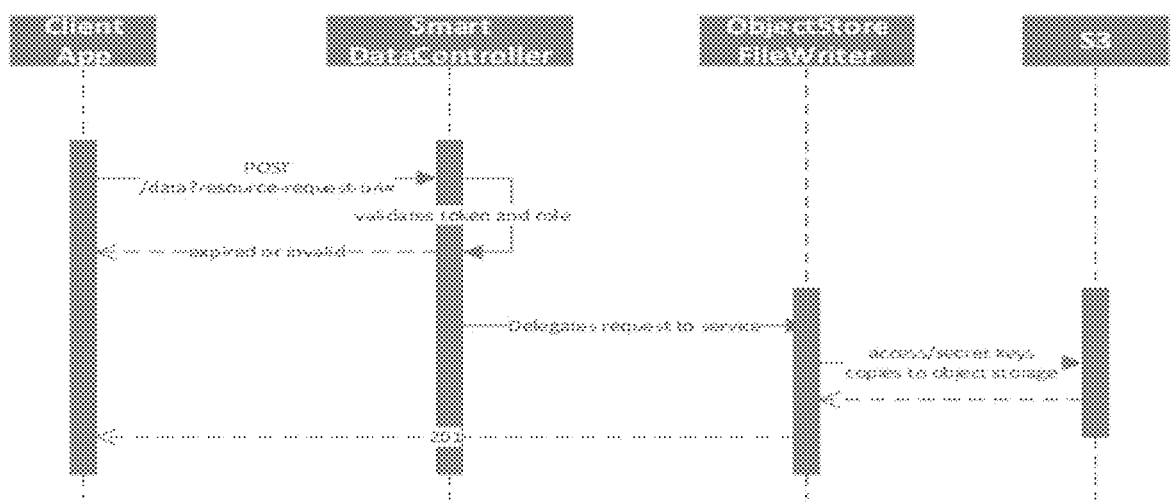
FIG. 14 is a sequence diagram that illustrates an upload file to object storage process that is usable for implementing a method for providing a reusable, plug and play microservice application to facilitate authenticated file transfers across a plurality of computing platforms and a plurality of storage options, according to an exemplary embodiment.

FIG. 14 is a sequence diagram 1400 that illustrates an upload file to object storage process that is usable for implementing a method for providing a reusable, plug and play microservice application to facilitate authenticated file transfers across a plurality of computing platforms and a plurality of storage options, according to an exemplary embodiment. As illustrated in FIG. 14, the client application transmits a "POST" request call with a token in the header, a file name as a query parameter, and a file in the request body. The SmartDataController may validate the token and authorize the client application based on the role. The SmartDataController may delegate the request to an ObjectStoreFileWriter when the authorization is successful. Then, the ObjectStoreFileWriter may copy the file to object storage and return a status code response.

Figure 15:
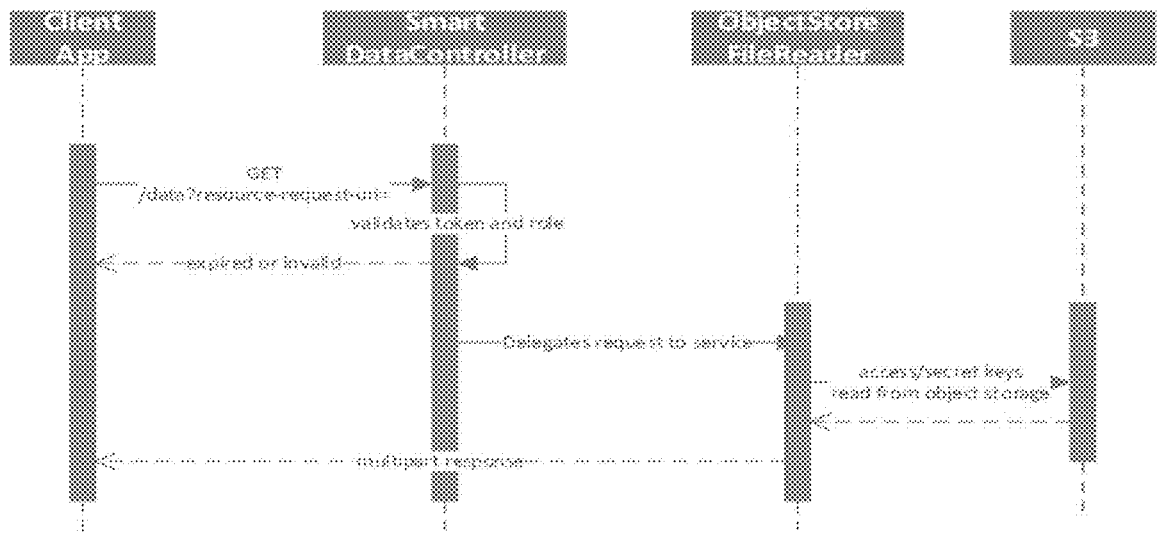
FIG. 15 is a sequence diagram that illustrates a read file from object storage process that is usable for implementing a method for providing a reusable, plug and play microservice application to facilitate authenticated file transfers across a plurality of computing platforms and a plurality of storage options, according to an exemplary embodiment.

FIG. 15 is a sequence diagram 1500 that illustrates a read file from object storage process that is usable for implementing a method for providing a reusable, plug and play microservice application to facilitate authenticated file transfers across a plurality of computing platforms and a plurality of storage options, according to an exemplary embodiment. As illustrated in FIG. 15, the client application transmits a "GET" request call with a token in the header and a file name and/or a root name/folder name as a query parameter. The SmartDataController may validate the token and authorize the client application based on the role. The SmartDataController may delegate the request to an ObjectStoreFileReader when the authorization is successful. Then, the ObjectStoreFileReader may read the file from object storage and return a multipart response.

Figure 16:
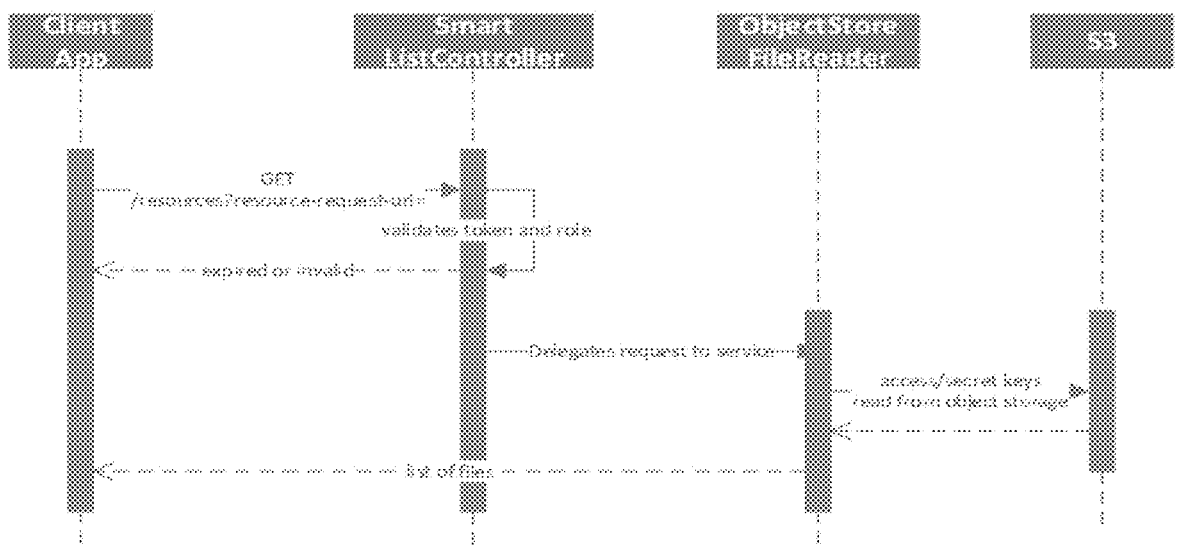
FIG. 16 is a sequence diagram that illustrates a read list file from object storage process that is usable for implementing a method for providing a reusable, plug and play microservice application to facilitate authenticated file transfers across a plurality of computing platforms and a plurality of storage options, according to an exemplary embodiment.

FIG. 16 is a sequence diagram 1600 that illustrates a read list file from object storage process that is usable for implementing a method for providing a reusable, plug and play microservice application to facilitate authenticated file transfers across a plurality of computing platforms and a plurality of storage options, according to an exemplary embodiment. As illustrated in FIG. 16, the client application transmits a "GET" request call with a token in the header and a file name and/or a root name/folder name as a query parameter. The SmartListController may validate the token and authorize the client application based on the role. The SmartListController may delegate the request to an ObjectStoreFileReader when the authorization is successful. Then, the ObjectStoreFileReader may read the file names from object storage and return a list.

Accordingly, with this technology, an optimized process for providing a reusable, plug and play microservice application to facilitate authenticated file transfers across a plurality of computing platforms and a plurality of storage options is disclosed.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for providing an application to facilitate authenticated file transfers across a plurality of computing platforms, the method being implemented by at least one processor, the method comprising:
   receiving, by the at least one processor from a client application, at least one call to perform at least one action, the at least one call including at least one message to transfer at least one file,
      wherein the client application includes a microservice application in an event-driven architecture;
      wherein the event-driven architecture includes at least one event producer and at least one event consumer in a coupled choreography; and
      wherein the event-driven architecture further includes a distributed streaming platform that processes an event stream in real-time, the event stream processing including a publishing action, a subscribing action, and a storing action;
   validating, by the at least one processor using an identity federation service, the at least one call based on the at least one message by,
      identifying, by the at least one processor, at least one identifier and application information from the at least one message; and
      comparing, by the at least one processor, the at least one identifier and the application information with known federated identity information,
      wherein the at least one identifier includes a token; and
      wherein the application information includes application role information, the application role information corresponding to a role of the application;
   authorizing, by the at least one processor, the at least one call and the client application based on a result of the validating;

generating, by the at least one processor, a negative validation response for the client application when the at least one call and the client application are not authorized,
  wherein the negative validation response includes token status information from the identity federation service; and
  wherein the token status information includes an expired token status and an invalid token status;
accessing, by the at least one processor, a networked repository via a secured communication protocol when the at least one call and the client application is authorized; and
initiating, by the at least one processor, the at least one action.

2. The method of claim 1, wherein the at least one action includes at least one from among a file push action to store the at least one file in the networked repository and a file pull action to retrieve the at least one file from the networked repository.

3. The method of claim 2, wherein the at least one message includes at least one from among a token in a header of the at least one message, a name of the at least one file as a query parameter, and the at least one file when the at least one call corresponds to the file push action.

4. The method of claim 3, when the at least one call corresponds to the file push action, further comprising:
  copying, by the at least one processor, the at least one file in the at least one message;
  writing, by the at least one processor, the copied at least one file to the networked repository; and
  transmitting, by the at least one processor via a communication interface, a status code to the client application in response to the at least one call.

5. The method of claim 4, further comprising:
  dividing, by the at least one processor, the copied at least one file into a plurality of component files based on at least one predetermined criterion, each of the plurality of component files corresponding to a part of the at least one file; and
  writing, by the at least one processor, each of the plurality of component files to the networked repository,
  wherein each of the plurality of component files is simultaneously written to the network repository.

6. The method of claim 2, wherein the at least one message includes at least one from among a token in a header of the at least one message and a characteristic of the at least one file as a query parameter when the at least one call corresponds to the file pull action, the characteristic including at least one from among a name of the at least one file and a location identifier of the at least one file.

7. The method of claim 6, when the at least one call corresponds to the file pull action, further comprising:
  identifying, by the at least one processor in the networked repository, the at least one file based on the at least one message;
  reading, by the at least one processor, the identified at least one file; and
  transmitting, by the at least one processor via a communication interface, a multipart reply to the client application in response to the at least one call.

8. The method of claim 1, wherein the at least one file includes at least one from among a list file and an object file, the at least one file relating to a computer resource for recording data in a computer storage device.

9. The method of claim 1, wherein the client application includes an application programming interface that is usable to implement microservice applications in a plurality of different operating systems that are each deployed on a plurality of different networked platforms.

10. The method of claim 1, further comprising:
  detecting, by the at least one processor, an interruption of the at least one action;
  identifying, by the at least one processor, an interruption point that relates to the at least one action based on the detected interruption; and
  automatically reinitiating, by the at least one processor, the at least one action at the identified interruption point.

11. A computing device configured to implement an execution of a method for providing an application to facilitate authenticated file transfers across a plurality of computing platforms, the computing device comprising:
  a processor;
  a memory; and
  a communication interface coupled to each of the processor and the memory,
  wherein the processor is configured to:
    receive, from a client application, at least one call to perform at least one action, the at least one call including at least one message to transfer at least one file,
      wherein the client application includes a microservice application in an event-driven architecture;
      wherein the event-driven architecture includes at least one event producer and at least one event consumer in a coupled choreography; and
      wherein the event-driven architecture further includes a distributed streaming platform that processes an event stream in real-time, the event stream processing including a publishing action, a subscribing action, and a storing action;
    validate, by using an identity federation service, the at least one call based on the at least one message by causing the processor to:
      identify at least one identifier and application information from the at least one message; and
      compare the at least one identifier and the application information with known federated identity information,
      wherein the at least one identifier includes a token; and
      wherein the application information includes application role information, the application role information corresponding to a role of the application;
    authorize the at least one call and the client application based on a result of the validating;
    generate a negative validation response for the client application when the at least one call and the client application are not authorized,
      wherein the negative validation response includes token status information from the identity federation service; and
      wherein the token status information includes an expired token status and an invalid token status;
    access a networked repository via a secured communication protocol when the at least one call and the client application is authorized; and
    initiate the at least one action.

12. The computing device of claim 11, wherein the at least one action includes at least one from among a file push action to store the at least one file in the networked repository and a file pull action to retrieve the at least one file from the networked repository.

13. The computing device of claim 12, wherein the at least one message includes at least one from among a token in a header of the at least one message, a name of the at least one file as a query parameter, and the at least one file when the at least one call corresponds to the file push action.

14. The computing device of claim 13, when the at least one call corresponds to the file push action, the processor is further configured to:
   copy the at least one file in the at least one message;
   write the copied at least one file to the networked repository; and
   transmit, via a communication interface, a status code to the client application in response to the at least one call.

15. The computing device of claim 14, wherein the processor is further configured to:
   divide the copied at least one file into a plurality of component files based on at least one predetermined criterion, each of the plurality of component files corresponding to a part of the at least one file; and
   write each of the plurality of component files to the networked repository,
   wherein each of the plurality of component files is simultaneously written to the network repository.

16. The computing device of claim 12, wherein the at least one message includes at least one from among a token in a header of the at least one message and a characteristic of the at least one file as a query parameter when the at least one call corresponds to the file pull action, the characteristic including at least one from among a name of the at least one file and a location identifier of the at least one file.

17. The computing device of claim 16, when the at least one call corresponds to the file pull action, the processor is further configured to:
   identify, in the networked repository, the at least one file based on the at least one message;
   read the identified at least one file; and
   transmit, via a communication interface, a multipart reply to the client application in response to the at least one call.

18. The computing device of claim 11, wherein the at least one file includes at least one from among a list file and an object file, the at least one file relating to a computer resource for recording data in a computer storage device.

19. The computing device of claim 11, wherein the client application includes an application programming interface that is usable to implement microservice applications in a plurality of different operating systems that are each deployed on a plurality of different networked platforms.

20. The computing device of claim 11, wherein the processor is further configured to:
   detect an interruption of the at least one action;
   identify an interruption point that relates to the at least one action based on the detected interruption; and
   automatically reinitiate the at least one action at the identified interruption point.

* * * * *